United States Patent
Yoshinaga

(10) Patent No.: US 11,911,746 B2
(45) Date of Patent: Feb. 27, 2024

(54) METHOD FOR MANUFACTURING WATER ABSORPTION TREATMENT MATERIAL

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 723 days.

(21) Appl. No.: 17/083,406

(22) Filed: Oct. 29, 2020

(65) Prior Publication Data

US 2021/0039071 A1    Feb. 11, 2021

Related U.S. Application Data

(63) Continuation of application No. PCT/JP2019/018235, filed on May 7, 2019.

(30) Foreign Application Priority Data

Jun. 21, 2018 (JP) ................ 2018-117500

(51) Int. Cl.
| | |
|---|---|
| B01J 20/26 | (2006.01) |
| B01J 20/30 | (2006.01) |
| B01J 20/32 | (2006.01) |
| B02C 23/10 | (2006.01) |
| B07B 1/24 | (2006.01) |
| B01J 20/28 | (2006.01) |
| B02C 19/06 | (2006.01) |
| B29B 17/02 | (2006.01) |

(52) U.S. Cl.
CPC .......... *B01J 20/3021* (2013.01); *B01J 20/26* (2013.01); *B01J 20/28016* (2013.01); *B01J 20/3293* (2013.01); *B02C 19/06* (2013.01); *B02C 23/10* (2013.01); *B29B 17/0206* (2013.01); *B01J 2220/4893* (2013.01); *B29B 2017/0217* (2013.01)

(58) Field of Classification Search
CPC .. B01J 20/26; B01J 20/30; B01J 20/32; B02C 23/10; B07B 1/24
See application file for complete search history.

(56) References Cited

U.S. PATENT DOCUMENTS

| | | | |
|---|---|---|---|
| 5,972,509 A | 10/1999 | Ito | |
| 2015/0360200 A1 | 12/2015 | Ito et al. | |
| 2015/0360203 A1* | 12/2015 | Ito ................... | B02C 23/10 |
| | | | 502/402 |
| 2016/0316713 A1 | 11/2016 | Mochizuki | |
| 2017/0239687 A1* | 8/2017 | Ito ................... | B29B 17/04 |

FOREIGN PATENT DOCUMENTS

| | | |
|---|---|---|
| CN | 105188912 A | 12/2015 |
| CN | 105813454 A | 7/2016 |
| EP | 2 995 373 A1 | 3/2016 |
| JP | WO2014/181469 A1 | 2/2017 |
| WO | 2014/181468 A1 | 11/2014 |
| WO | 2017/104062 A1 | 6/2017 |

OTHER PUBLICATIONS

Oct. 2, 2021 Office Action issued in Japanese Patent Application No. 2018-117500.
Jun. 9, 2021 Extended Search Report issued in European Patent Application No. 19822334.9.

* cited by examiner

*Primary Examiner* — Caixia Lu
(74) *Attorney, Agent, or Firm* — Oliff PLC

(57) ABSTRACT

A method for manufacturing a water absorption treatment material made of a plurality of grains includes a preparing step, a pulverizing step, a core portion forming step, and a coating portion forming step. The preparing step is a step of preparing a paper powder to which water-absorbent polymers adhere, the paper powder being derived from a sanitary product. The pulverizing step is a step of pulverizing remaining polymers using a pulverizer. The core portion forming step is a step of forming a core portion constituting each of the grains The coating portion forming step is a step of forming a coating portion so as to cover the core portion, the coating portion containing the paper powder, and the remaining polymers pulverized in the pulverizing step. In the pulverizing step, the remaining polymers left in a state of adhering to the paper powder are subjected to the pulverizer.

17 Claims, 3 Drawing Sheets

METHOD FOR MANUFACTURING WATER ABSORPTION TREATMENT MATERIAL

CROSS REFERENCE TO RELATED APPLICATION

This is a Continuation of International Application No. PCT/JP2019/018235 filed May 7, 2019, which claims the benefit of Japanese Application No. 2018-117500 filed Jun. 21, 2018. The contents of these applications are hereby incorporated by reference in their entirety.

TECHNICAL FIELD

The present invention relates to a method for manufacturing a water absorption treatment material that absorbs a liquid.

BACKGROUND ART

Examples of conventional water absorption treatment materials include the material described in Patent Document 1. The water absorption treatment material described in this document is made of a plurality of grains each including a granular core portion and a coating portion that covers the core portion. The coating portion contains a water-absorbent material that is a paper powder (fluff pulp) obtained by classifying sanitary products such as paper diapers, and an adhesive material that is a water-absorbent polymer (separated polymer) separated from the paper powder. The separated polymer is pulverized to have a predetermined particle size or less. The separated polymer contributes to the agglomerating function of the coating portion, that is, the function of causing grains that have absorbed a liquid during use to be bonded to each other to form agglomerations.

CITATION LIST

Patent Document

Patent Document 1: WO 2014/181468 A1

SUMMARY OF INVENTION

Technical Problem

However, the paper powder contained in the coating portion is derived from sanitary products as described above. Accordingly, a water-absorbent polymer contained in the sanitary products adheres to the paper powder. The paper powder with adhered water-absorbent polymer (remaining polymer) has a particle size that is larger than that of the particle of the separated polymers. The paper powder with adhered water-absorbent polymer is likely to have smaller adhesive strength and swell to a greater level when water is absorbed, in accordance with an increase in the particle size. Thus, in conventional water absorption treatment materials, a large particle size of the paper powder with adhered remaining polymer lowers the agglomerating function.

Solution to Problem

The present invention was made in view of the above-described problems, and it is an object thereof to provide a method for manufacturing a water absorption treatment material in which the agglomerating function can be improved.

A method for manufacturing a water absorption treatment material according to the present invention is a method for manufacturing a water absorption treatment material made of a plurality of grains, including: a preparing step of preparing a paper powder to which water-absorbent polymers adhere, the paper powder being derived from a sanitary product; a first pulverizing step of pulverizing remaining polymers that are the water-absorbent polymers remaining on the paper powder, using a first pulverizer; a core portion forming step of forming a granular core portion constituting each of the grains; and a coating portion forming step of forming a coating portion so as to cover the core portion, the coating portion containing the paper powder, and the remaining polymers pulverized in the first pulverizing step, wherein, in the first pulverizing step, the remaining polymers left in a state of adhering to the paper powder are subjected to the first pulverizer.

According to this manufacturing method, the first pulverizing step of pulverizing the remaining polymers using the first pulverizer is performed. In the first pulverizing step, the remaining polymers left in a state of adhering to the paper powder are subjected to the first pulverizer. Accordingly, it is possible to reduce the particle size of the remaining polymers, thereby increasing the adhesive strength and suppressing swelling when water is absorbed. Thus, it is possible to increase the contribution of the remaining polymers to the agglomerating function in the manufactured water absorption treatment material.

Advantageous Effects of Invention

The present invention realizes a method for manufacturing a water absorption treatment material in which the agglomerating function can be improved.

DESCRIPTION OF EMBODIMENTS

Figure 1:
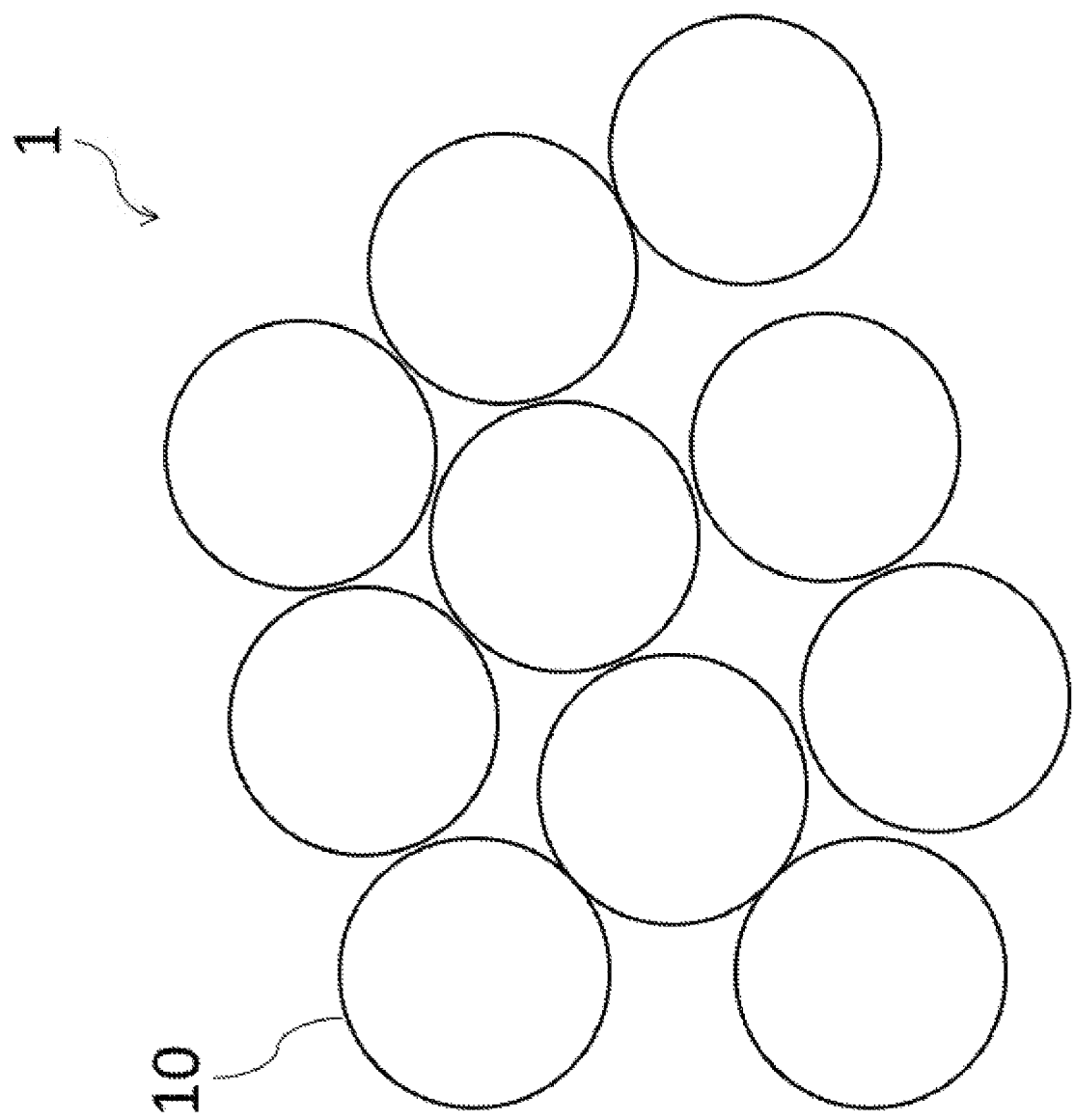
FIG. 1 is a schematic view showing an embodiment of a water absorption treatment material according to the present invention.

Hereinafter, an embodiment of the present invention will be described in detail with reference to the drawings. In the description of the drawings, the same constituent elements are given the same reference numerals, and redundant descriptions thereof will be omitted.

FIG. 1 is a schematic view showing an embodiment of a water absorption treatment material according to the present invention. A water absorption treatment material 1 is made of a plurality of grains 10. Each grain 10 is water-absorbent, and absorbs a liquid that is to be treated. The grains 10 are configured so as to bond to each other upon absorbing a liquid. In this embodiment, the water absorption treatment material 1 is an animal excrement treatment material that absorbs excrement of animals such as cats and dogs, and is used in a state of being placed in an animal litter box.

Figure 2:
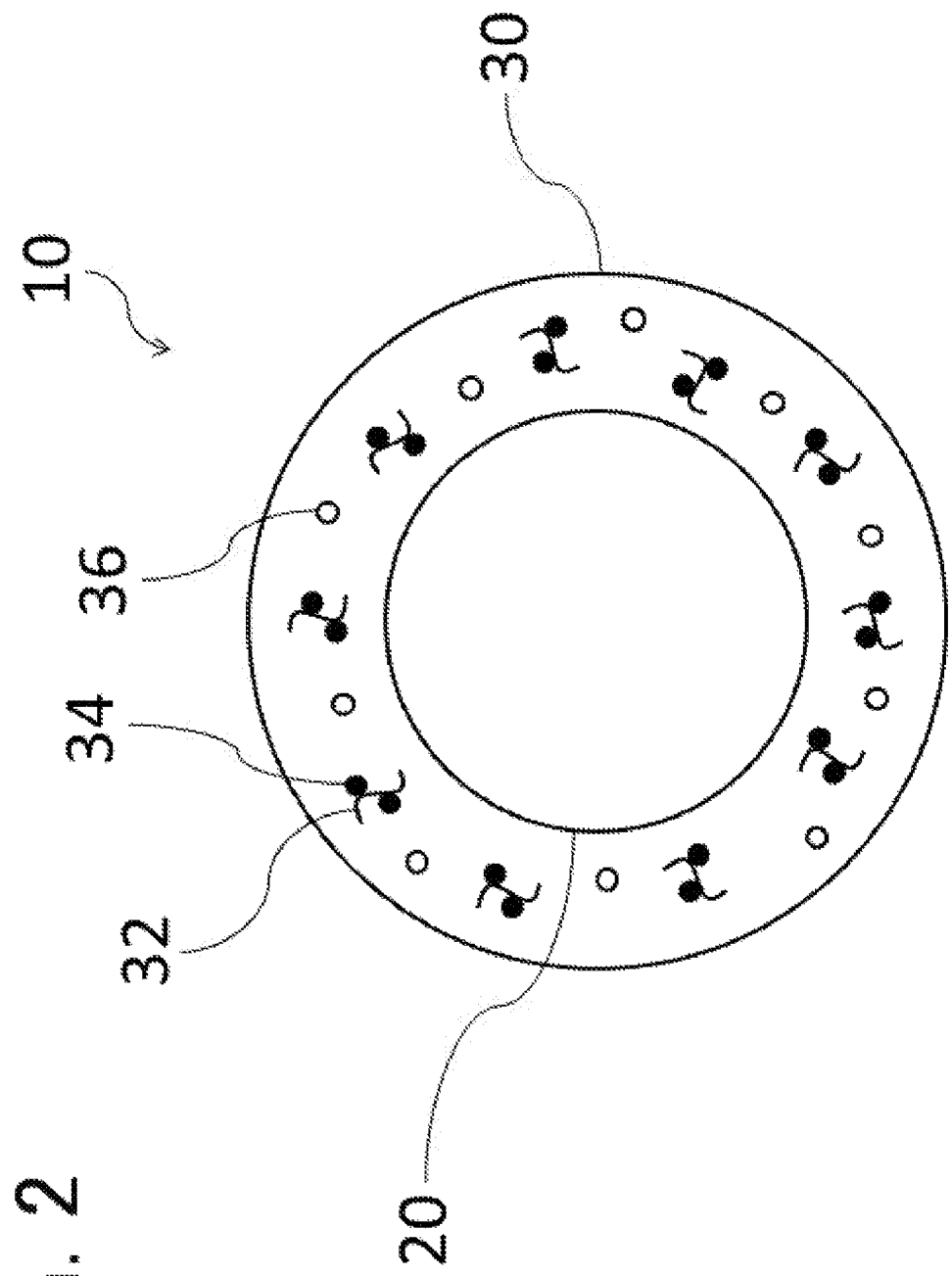
FIG. 2 is a schematic view showing a grain 10.

FIG. 2 is a schematic view showing the grain 10. The grain 10 includes a core portion 20 and a coating portion 30. The core portion 20 is shaped in a granular shape. Examples of the granular shape include a spherical shape, a cylindrical shape, and an ellipsoidal shape. The core portion 20 has a function of absorbing and retaining a liquid. The main material of the core portion 20 is a water-absorbent material. "Main material of the core portion 20" as used herein means a material having the highest weight ratio in the core portion 20, among the material(s) constituting the core portion 20. The core portion 20 may be made of a water-absorbent material only, or made of a water-absorbent material and another material. The water-absorbent material is preferably an organic substance. Examples of the water-absorbent material that is an organic substance include papers, used tea leaves, plastics, and soybean refuse.

Papers refer to a material mainly made of pulp. Examples of papers include ordinary paper, a vinyl chloride wallpaper classified product (paper obtained by classifying vinyl chloride wallpaper), fluff pulp, papermaking sludge, and pulp sludge. As the plastics, it is possible to use, for example, a paper diaper classified product (plastics obtained by classifying paper diapers). The soybean refuse is preferably dried soybean refuse.

The coating portion 30 covers the core portion 20. The coating portion 30 may cover the entire surface of the core portion 20, or cover only a part of the surface of the core portion 20. The coating portion 30 has an agglomerating function. The coating portion 30 contains a paper powder 32, remaining polymers 34, and separated polymers 36. The coating portion 30 may be constituted by the paper powder 32, the remaining polymers 34, and the separated polymers 36 only, or constituted by these materials and another material. All of the paper powder 32, the remaining polymers 34, and the separated polymers 36 are derived from sanitary products. "Derived from sanitary products" as used herein means that these materials are generated when producing or classifying sanitary products. Examples of the sanitary products include paper diapers, sanitary napkins, and incontinence pads.

The remaining polymers 34 are water-absorbent polymers remaining on the paper powder 32. "Remaining on the paper powder 32" as used herein means a state of adhering to the paper powder 32 immediately before a later-described first pulverizing step is performed. Meanwhile, the separated polymers 36 are water-absorbent polymers separated from the paper powder 32 in a later-described separating step.

Figure 3:
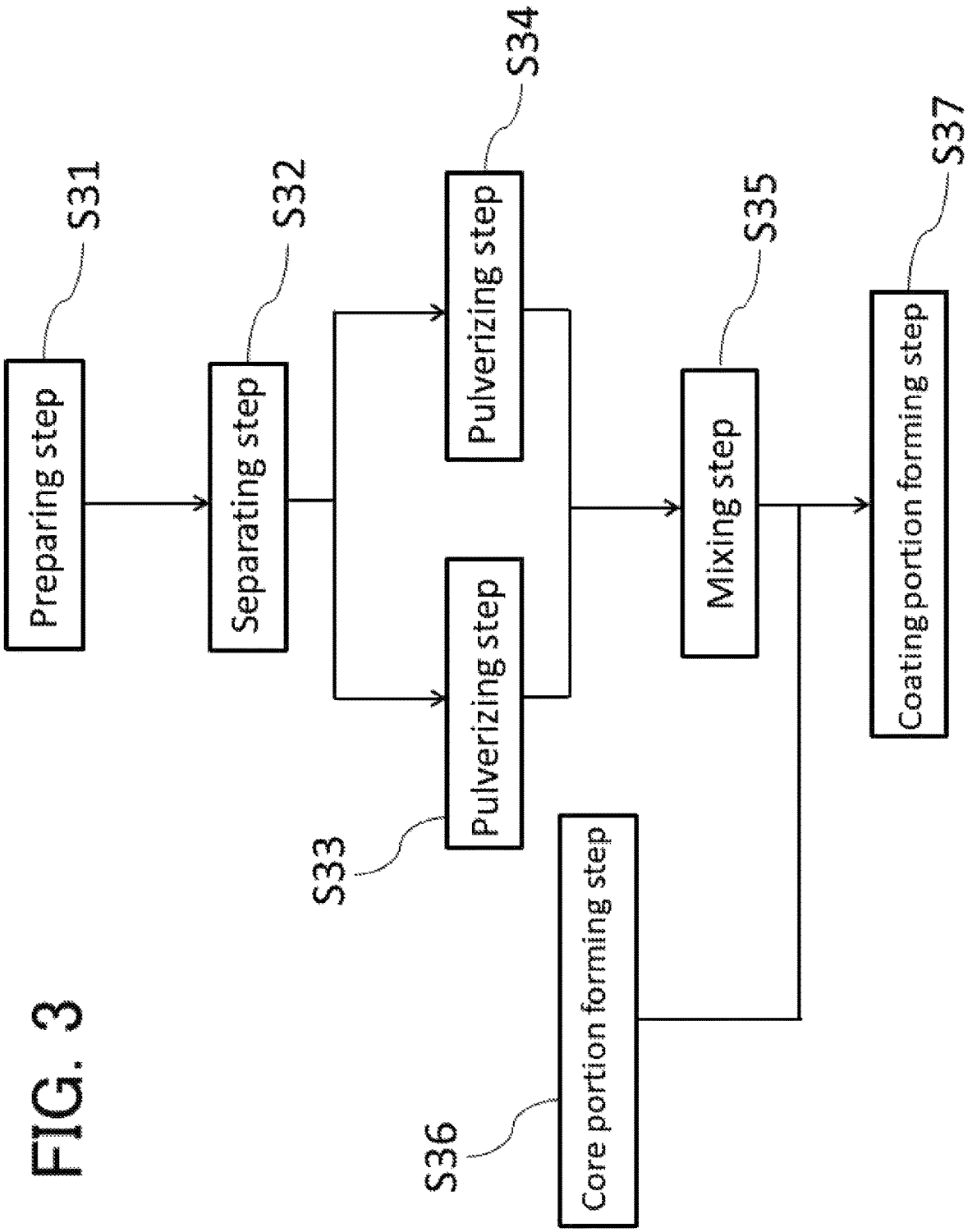
FIG. 3 is a flowchart illustrating an embodiment of a method for manufacturing a water absorption treatment material according to the present invention.

Hereinafter, an example of a method for manufacturing the water absorption treatment material 1 will be described with reference to FIG. 3 as an embodiment of the method for manufacturing a water absorption treatment material according to the present invention. This manufacturing method includes a preparing step S31, a separating step S32, a pulverizing step S33 (first pulverizing step), a pulverizing step S34 (second pulverizing step), a mixing step S35, a core portion forming step S36, and a coating portion forming step S37.

The preparing step S31 is a step of preparing the paper powder 32 to which water-absorbent polymers adhere, the paper powder being derived from sanitary products. In this step, the paper powder 32 may be prepared by obtaining the paper powder 32 generated when producing or classifying sanitary products, or the paper powder 32 may be prepared by acquiring the paper powder 32 through classifying of sanitary products.

The separating step S32 is a step of separating part of the water-absorbent polymers adhering to the paper powder 32, from the paper powder 32, before the pulverizing step S33 and the pulverizing step S34. This separation can be performed using a known separator. In this step, the paper powder 32 may be pulverized using a pulverizer, before the paper powder 32 to which water-absorbent polymers adhere is subjected to the separator. The water-absorbent polymers separated from the paper powder 32 in the separating step S32 constitute the separated polymers 36, and the water-absorbent polymers not separated therefrom constitute the remaining polymers 34.

The pulverizing step S33 is a step of pulverizing the remaining polymers 34 using a pulverizer (first pulverizer). In this step, the remaining polymers 34 left in a state of adhering to the paper powder 32 are subjected to the first pulverizer. At this time, it is preferable that the remaining polymers 34 are pulverized such that the average particle size of the remaining polymers 34 is ½ or less of the average particle size of the remaining polymers 34 immediately before being subjected to the first pulverizer, and more preferable that the remaining polymers 34 are pulverized such that the average particle size of the remaining polymers 34 is ¼ or less of the average particle size of the remaining polymers 34 immediately before being subjected to the first pulverizer.

Furthermore, it is preferable that the remaining polymers 34 are pulverized such that the average particle size of the remaining polymers 34 is 50 μm or less, and it is more preferable that the remaining polymers 34 are pulverized such that the average particle size of the remaining polymers 34 is 25 μm or less. "Average particle size" as used herein means the smallest mesh opening through which 50 wt % or more of particles can pass when water-absorbing polymers, which is a group of a large number of particles, are put through a sieve. Accordingly, "average particle size is 50 μm or less" means that, when water-absorbing polymers are put through a sieve with 50-μm mesh openings, 50 wt % or more of the particles can pass therethrough. The first pulverizer is a fine pulverizer. A jet mill or a turbo mill may be used as the first pulverizer, for example.

The pulverizing step S34 is a step of pulverizing the separated polymers 36 using a pulverizer (second pulverizer). It is preferable that the separated polymers 36 are pulverized such that the average particle size of the separated polymers 36 is ½ or less of the average particle size of the separated polymers 36 immediately before being subjected to the second pulverizer, and it is more preferable that the separated polymers 36 are pulverized such that the average particle size of the separated polymers 36 is ¼ or less of the average particle size of the separated polymers 36 immediately before being subjected to the second pulverizer. Furthermore, it is preferable that the separated polymers 36 are pulverized such that the average particle size of the separated polymers 36 is 50 μm or less, and it is more preferable that the separated polymers 36 are pulverized such that the average particle size of the separated polymers 36 is 25 μm or less. The second pulverizer is a fine pulverizer. A jet mill or a turbo mill may be used as the second pulverizer, for example.

In the pulverizing step S33, it is preferable that the remaining polymers 34 are pulverized such that the average particle size of the remaining polymers 34 is between 80% and 120% inclusive of the average particle size of the separated polymers 36 pulverized in the pulverizing step S34. Note that there is no limitation on the order in which the pulverizing step S33 and the pulverizing step S34 are performed. That is to say, either one of these two steps may be performed earlier than the other, the two steps may be simultaneously performed. Furthermore, one fine pulverizer may be shared as the first and second pulverizers respectively in the pulverizing step S33 and the pulverizing step S34. In that case, either one of these two steps is performed earlier than the other.

The mixing step S35 is a step of mixing the remaining polymers 34 and the separated polymers 36, thereby obtaining a coating material for constituting the coating portion 30, before the coating portion forming step S37. The remaining polymers 34 and the separated polymers 36 are polymers obtained through pulverization respectively in the pulverizing step S33 and the pulverizing step S34. At this time, the paper powder 32 together with the remaining polymers 34 is mixed with the separated polymers 36. In the mixing step S35, it is preferable that the remaining polymers 34 and the separated polymers 36 are mixed such that the weight ratio of the separated polymers 36 in the coating material is smaller than the weight ratio of the remaining polymers 34 in the coating material. At this time, it is particularly preferable that the weight ratio of the separated polymers 36 is ½ or less of the weight ratio of the remaining polymers 34.

The core portion forming step S36 is a step of forming the core portion 20 constituting each of the grains 10. In this step, a plurality of the core portions 20 are formed by granulating a core portion material (a material for constituting the core portion 20) using a granulator. An extrusion granulator may be used as the granulator, for example. Before the granulation, the core portion material is subjected to pre-treatment such as pulverization, kneading, or adding water, as necessary. Note that the core portion forming step S36 may be performed at any point in time, as long as it is before the coating portion forming step S37. That is to say, there is no limitation on the order in which the core portion forming step S36 and the steps (the preparing step S31, the separating step S32, the pulverizing step S33, the pulverizing step S34, and the mixing step S35) other than the coating portion forming step S37 are performed.

The coating portion forming step S37 is a step of forming the coating portion 30 so as to cover each of the core portions 20. In this step, the coating material is attached to the surface of the core portion 20 using a coating apparatus or the like. The coating material may be attached, for example, through sprinkling or spraying. Accordingly, the coating portion 30 containing the paper powder 32, the remaining polymers 34, and the separated polymers 36 is formed. Subsequently, aftertreatment such as sieving or drying is performed as necessary. Accordingly, a water absorption treatment material 1 made of a plurality of grains 10 is obtained.

Hereinafter, effects of this embodiment will be described. In this embodiment, the pulverizing step S33 of pulverizing the remaining polymers 34 using the first pulverizer is performed. In the pulverizing step S33, the remaining polymers 34 left in a state of adhering to the paper powder 32 are subjected to the first pulverizer. Accordingly, it is possible to reduce the particle size of the remaining polymers 34, thereby increasing the adhesive strength and suppressing swelling when water is absorbed. Thus, it is possible to increase the contribution of the remaining polymers 34 to the agglomerating function in the water absorption treatment material 1. Accordingly, a method for manufacturing the water absorption treatment material 1 in which the agglomerating function can be improved is realized.

In this manner, in the pulverizing step S33, because the paper powder 32 together with the remaining polymers 34 is subjected to the first pulverizer, the paper powder 32 and eventually the coating material can be shaped into a fine powder. Accordingly, the appearance of the coating portion 30 can be made better, and thus the appearance of the water absorption treatment material 1 can be improved.

On the other hand, if the pulverizing step S33 is not performed, remaining polymers 34 whose particle size is left large are contained in the coating portion 30. If the particle size of the remaining polymers 34 is large, the level to which the remaining polymers 34 swell when water is absorbed increases, and thus the volume of the coating portion 30 increases. Even in the case of the same total adhesive strength of the water-absorbent polymers contained in the coating portion 30, the larger the volume of the coating portion 30 is, the smaller the adhesive strength per unit volume of the coating portion 30 is, and thus the agglomerating function is lowered. Accordingly, if the particle size of the remaining polymers 34 is large, the agglomerating function is lowered not only directly due to the adhesive strength of the remaining polymers 34 itself lowering, but also indirectly due to the adhesive strength per unit volume of the coating portion 30 lowering caused by the remaining polymers 34 swelling.

In the water absorption treatment material 1, a large particle size of the remaining polymers 34 not only lowers the agglomerating function, but also makes the coating portion 30 likely to peel away. The coating portion 30 that peels away before use is problematic in that animals, their owners, or the like using the water absorption treatment material 1 may inhale the coating material, or the coating material may be scattered to make the animal litter box or the vicinity thereof messy. According to this embodiment, the remaining polymers 34 are pulverized in the pulverizing step S33, and thus the coating portion 30 can be made unlikely to peel away.

In order to improve the agglomerating function and to make the coating portion 30 unlikely to peel away in this manner, it is advantageous to reduce the particle size of the remaining polymers 34 to all extent possible. From these viewpoints, in the pulverizing step S33, it is preferable that the remaining polymers 34 are pulverized such that the average particle size of the remaining polymers 34 is ½ or less of the average particle size of the remaining polymers 34 immediately before being subjected to the first pulverizer, and it is more preferable that the remaining polymers 34 are pulverized such that the average particle size of the remaining polymers 34 is ¼ or less of the average particle size of the remaining polymers 34 immediately before being subjected to the first pulverizer.

From the same viewpoints, in the pulverizing step S33, it is preferable that the remaining polymers 34 are pulverized such that the average particle size of the remaining polymers 34 is 50 µm or less, and it is more preferable that the remaining polymers 34 are pulverized such that the average particle size of the remaining polymers 34 is 25 µm or less. On the other hand, if the required particle size of the remaining polymers 34 is too small, special pulverizers may be necessary, which may lead to an increase in the manufacturing cost of the water absorption treatment material 1. From these viewpoints, it is preferable that the average particle size of the remaining polymers 34 after pulverization in the pulverizing step S33 is 1 µm or more.

A fine pulverizer is used as the first pulverizer. Accordingly, it is possible to sufficiently reduce the particle size of the remaining polymers 34 in the pulverizing step S33. It is preferable to use a jet mill or a turbo mill as the first pulverizer.

The separating step of separating part of the water-absorbent polymers adhering to the paper powder 32, from the paper powder 32 is performed before the pulverizing step S33. Accordingly, it is possible to adjust the amount of water-absorbent polymers (the remaining polymers 34) adhering to the paper powder 32, before the pulverizing step S33.

The pulverizing step S34 of pulverizing the separated polymers 36 using the second pulverizer is performed. Accordingly, it is possible to reduce the particle size of the separated polymers 36. If the particle size of the separated polymers 36 is reduced, the separated polymers 36 can be preferably used as the adhesive material. Actually, in this embodiment, the separated polymers 36 pulverized in the pulverizing step S34 are contained as the adhesive material in the coating portion 30.

A fine pulverizer is used as the second pulverizer. Accordingly, it is possible to sufficiently reduce the particle size of the separated polymers 36 in the pulverizing step S34. It is preferable to use a jet mill or a turbo mill as the second pulverizer.

The mixing step S35 of mixing the remaining polymers 34 and the separated polymers 36, thereby obtaining a coating material for constituting the coating portion 30 is performed before the coating portion forming step S37. Accordingly, it is easy to adjust the weight ratio of the remaining polymers 34 and the separated polymers 36 in the coating material. Note that it is not absolutely necessary to perform the mixing step S35.

In the mixing step S35, if the remaining polymers 34 and the separated polymers 36 are mixed such that the weight ratio of the separated polymers 36 in the coating material is smaller than the weight ratio of the remaining polymers 34 in the coating material, it is possible to save the amount of the separated polymers 36 used. The separated polymers 36 that are present alone can be used in a wider variety of applications and are more valuable than the remaining polymers 34 that are present in a mixed manner with another material (the paper powder 32). Accordingly, saving the amount of the separated polymers 36 used contributes to a reduction in the manufacturing cost of the water absorption treatment material 1. In this embodiment, the remaining polymers 34 can be used as the adhesive material, and thus the agglomerating function of the coating portion 30 can be maintained even when the amount of separated polymers 36 is reduced.

From the viewpoint of saving the amount of the separated polymers 36 used in this manner, it is particularly preferable that the remaining polymers 34 and the separated polymers 36 are mixed such that the weight ratio of the separated polymers 36 in the coating material is ½ or less of the weight ratio of the remaining polymers 34 in the coating material.

In order to increase the contribution of the remaining polymers 34 to the agglomerating function, it is preferable to set the particle size of the remaining polymers 34 to a size that is similar to the particle size of the separated polymers 36. From these viewpoints, in the pulverizing step S33, it is preferable that the remaining polymers 34 are pulverized such that the average particle size of the remaining polymers 34 is between 80% and 120% inclusive of the average particle size of the separated polymers 36 pulverized in the second pulverizing step.

If one fine pulverizer is shared as the first and second pulverizers respectively in the pulverizing step S33 and the pulverizing step S34, it is possible to reduce the manufacturing cost of the water absorption treatment material 1 compared with the case in which different fine pulverizers are used.

If a paper powder generated when producing sanitary products is used as the paper powder 32, it is possible to effectively use materials (a paper powder, and water-absorbent polymers adhering to the paper powder) obtained as remnants when producing sanitary products, as a material for the coating portion 30.

If a paper powder generated when classifying sanitary products is used as the paper powder 32, it is possible to effectively use recycled materials (a paper powder, and water-absorbent polymers adhering to the paper powder) obtained by classifying sanitary products, as a material for the coating portion 30.

The present invention is not limited to the embodiment given above, and various modifications can be made. In the embodiment given above, an example was shown in which the coating portion 30 contains both of the remaining polymers 34 and the separated polymers 36. However, it is also possible that the coating portion 30 contains only the remaining polymers 34, out of the remaining polymers 34 and the separated polymers 36. In that case, it is not essential to perform the separating step S32. If the separating step S32 is not performed, the pulverizing step S34 is not performed.

In the foregoing embodiment, an animal excrement treatment material was shown as an example of the water absorption treatment material 1. However, it is also possible that the water absorption treatment material 1 is a human excrement treatment material that absorbs excrement of humans. Alternatively, it is also possible that the water absorption treatment material 1 is a vomited matter treatment material that absorbs a vomited matter, or a food waste treatment material that absorbs food waste (moisture contained in the food waste).

LIST OF REFERENCE NUMERALS

1 Water absorption treatment material
10 Grain
20 Core portion
30 Coating portion
32 Paper powder
34 Remaining polymer
36 Separated polymer

The invention claimed is:

1. A method for manufacturing a water absorption treatment material made of a plurality of grains, comprising:
   a preparing step of preparing a paper powder to which water-absorbent polymers adhere, the paper powder being derived from a sanitary product;
   a separating step of separating part of water-absorbent polymers from the paper powder adhered with water-absorbent polymers to provide a paper powder adhered with remaining water-absorbent polymers and a particle of separated water-absorbent polymers;
   a first pulverizing step of pulverizing remaining polymers that are the water-absorbent polymers remaining on the paper powder, using a first pulverizer;
   a core portion forming step of forming a granular core portion constituting each of the grains; and
   a coating portion forming step of forming a coating portion so as to cover the core portion, the coating portion containing the paper powder and the remaining polymers pulverized in the first pulverizing step,
   wherein, in the first pulverizing step, the remaining polymers left in a state of adhering to the paper powder are subjected to the first pulverizer.

2. The method for manufacturing a water absorption treatment material according to claim 1,
   wherein, in the first pulverizing step, the remaining polymers are pulverized such that an average particle size of the remaining polymers is ½ or less of an average particle size of the remaining polymers immediately before being subjected to the first pulverizer.

3. The method for manufacturing a water absorption treatment material according to claim 2,
wherein, in the first pulverizing step, the remaining polymers are pulverized such that the average particle size of the remaining polymers is ¼ or less of the average particle size of the remaining polymers immediately before being subjected to the first pulverizer.

4. The method for manufacturing a water absorption treatment material according to claim 1,
wherein, in the first pulverizing step, the remaining polymers are pulverized such that an average particle size of the remaining polymers is 50 μm or less.

5. The method for manufacturing a water absorption treatment material according to claim 4,
wherein, in the first pulverizing step, the remaining polymers are pulverized such that the average particle size of the remaining polymers is 25 μm or less.

6. The method for manufacturing a water absorption treatment material according to claim 1,
wherein the first pulverizer is a jet mill or a turbo mill.

7. The method for manufacturing a water absorption treatment material according to claim 1, further comprising a second pulverizing step of pulverizing separated polymers that are the water-absorbent polymers separated from the paper powder in the separating step, using a second pulverizer.

8. The method for manufacturing a water absorption treatment material according to claim 7,
wherein, in the coating portion forming step, the coating portion containing the separated polymers pulverized in the second pulverizing step, in addition to the paper powder and the remaining polymers, is formed.

9. The method for manufacturing a water absorption treatment material according to claim 8, further comprising a mixing step of mixing the remaining polymers pulverized in the first pulverizing step and the separated polymers pulverized in the second pulverizing step, thereby obtaining a coating material for constituting the coating portion, before the coating portion forming step.

10. The method for manufacturing a water absorption treatment material according to claim 9,
wherein, in the mixing step, the remaining polymers and the separated polymers are mixed such that a weight ratio of the separated polymers in the coating material is smaller than a weight ratio of the remaining polymers in the coating material.

11. The method for manufacturing a water absorption treatment material according to claim 10,
wherein, in the mixing step, the remaining polymers and the separated polymers are mixed such that the weight ratio of the separated polymers in the coating material is ½ or less of the weight ratio of the remaining polymers in the coating material.

12. The method for manufacturing a water absorption treatment material according to claim 7,
wherein, in the first pulverizing step, the remaining polymers are pulverized such that an average particle size of the remaining polymers is between 80% and 120% inclusive of an average particle size of the separated polymers pulverized in the second pulverizing step.

13. The method for manufacturing a water absorption treatment material according to claim 7,
wherein the second pulverizer is a jet mill or a turbo mill.

14. The method for manufacturing a water absorption treatment material according to claim 7,
wherein one pulverizer is shared as the first and second pulverizers respectively in the first and second pulverizing steps.

15. The method for manufacturing a water absorption treatment material according to claim 1,
wherein, in the preparing step, a paper powder generated when producing the sanitary product is prepared as the paper powder.

16. The method for manufacturing a water absorption treatment material according to claim 1,
wherein, in the preparing step, a paper powder generated when classifying the sanitary product is prepared as the paper powder.

17. The method for manufacturing a water absorption treatment material according to claim 1,
wherein the sanitary product is a paper diaper, a sanitary napkin, or an incontinence pad.

* * * * *